US009927319B2

(12) United States Patent
Nance

(10) Patent No.: US 9,927,319 B2
(45) Date of Patent: Mar. 27, 2018

(54) METHOD FOR DETERMINING AIRCRAFT CENTER OF GRAVITY INDEPENDENT OF MEASURING THE AIRCRAFT WEIGHT

(71) Applicant: C. Kirk Nance, Keller, TX (US)

(72) Inventor: C. Kirk Nance, Keller, TX (US)

( * ) Notice: Subject to any disclaimer, the term of this patent is extended or adjusted under 35 U.S.C. 154(b) by 0 days.

(21) Appl. No.: 14/502,680

(22) Filed: Sep. 30, 2014

(65) Prior Publication Data

US 2015/0316438 A1 Nov. 5, 2015

Related U.S. Application Data

(60) Provisional application No. 61/885,217, filed on Oct. 1, 2013.

(51) Int. Cl.
*G01M 1/12* (2006.01)
*B64D 45/00* (2006.01)
*G01G 19/07* (2006.01)

(52) U.S. Cl.
CPC .......... *G01M 1/125* (2013.01); *B64D 45/00* (2013.01); *G01G 19/07* (2013.01)

(58) Field of Classification Search
CPC ........ G01M 1/125; B64D 45/00; G01G 19/07
See application file for complete search history.

(56) References Cited

U.S. PATENT DOCUMENTS

| 3,513,300 A | 5/1970 | Elfenbein et al. |
| 3,584,503 A | 6/1971 | Senour |
| 3,701,279 A | 10/1972 | Harris et al. |
| 5,214,586 A | 5/1993 | Nance |
| 5,521,827 A | 5/1996 | Lindberg et al. |
| 5,548,517 A | 8/1996 | Nance |
| 6,128,951 A | 10/2000 | Nance |

(Continued)

OTHER PUBLICATIONS

U.S. Appl. No. 14/502,680 Amended_Claim; authored by: Geoffrey a. Mantooth; Recieved Sep. 10, 2015.*

(Continued)

*Primary Examiner* — James Trammell
*Assistant Examiner* — James E Stroud
(74) *Attorney, Agent, or Firm* — Geoffrey A. Mantooth; Brian K. You

(57) ABSTRACT

A method which determines aircraft Center of Gravity independent of measuring the aircraft weight. The method is used in monitoring, measuring and computing the Center of Gravity of an aircraft utilizing pressurized, telescopic landing gear struts with axles. Pressure sensors are mounted in relation to each of the landing gear struts to monitor, measure and record aircraft landing gear strut loads by way of pressure. Axle deflection sensors are mounted in relation to each of the landing gear axles to monitor, measure and record aircraft landing gear axle loads by way of deflection. Nose landing gear strut pressure and corresponding values from axle deflection sensors may be adjusted in correlation to the reduced size of the nose landing gear, as compared to the size of the main landing gear, allowing aircraft Center of Gravity to be determined from the combined measured main landing gear pressures in relation to a nose landing gear strut pressure measurements, or combined main landing gear axle deflection sensor in relation to a nose landing gear axle deflection sensor; without any determination of the aircraft weight.

11 Claims, 6 Drawing Sheets

(56) References Cited

U.S. PATENT DOCUMENTS

| | | |
|---|---|---|
| 6,193,190 B1 | 2/2001 | Nance |
| 6,237,406 B1 | 5/2001 | Nance |
| 6,237,407 B1 | 5/2001 | Nance |
| 6,293,141 B1 | 9/2001 | Nance |
| 6,353,793 B1 | 3/2002 | Godwin et al. |
| 7,193,530 B2 | 3/2007 | Nance |
| 7,274,309 B2 | 9/2007 | Nance |
| 7,274,310 B1 | 9/2007 | Nance |
| 7,967,244 B2 | 6/2011 | Long et al. |
| 8,042,765 B1 | 10/2011 | Nance |
| 8,060,296 B2 | 11/2011 | Vetsch |
| 8,180,504 B1 | 5/2012 | Nance |
| 8,543,322 B1 | 9/2013 | Nance |
| 8,565,965 B2 | 10/2013 | Nance |
| 8,565,968 B2 | 10/2013 | Nance |
| 2011/0087424 A1 | 4/2011 | Long et al. |

OTHER PUBLICATIONS

Patent Cooperation Treaty (PCT), International Search Report, PCT/US2014/058537, dated Dec. 30, 2014, Applicant: C. Kirk Nance, 3 pages.

Patent Cooperation Treaty (PCT, Written Opinion of the International Searching Authority, dated Dec. 30, 2014, Applicant: C. Kirk Nance, 4 pages.

* cited by examiner

METHOD FOR DETERMINING AIRCRAFT CENTER OF GRAVITY INDEPENDENT OF MEASURING THE AIRCRAFT WEIGHT

This application claims the benefit of U.S. provisional patent application Ser. No. 61/885,217, filed Oct. 1, 2013.

BACKGROUND OF THE INVENTION

There are many critical factors the pilot of an aircraft must consider when determining if the aircraft is safe for take-off. Some of those factors are identifying the proper weight and center of gravity for the aircraft. Hereinafter, aircraft "Center of Gravity" will be referred to as aircraft "CG."

Aircraft CG is a critical factor in flight operations. If the aircraft CG is too far aft and outside the aircraft's certified CG limits, the aircraft nose can rise uncontrollably during take-off, where the aircraft will become unstable, resulting in a stall and possible crash.

Furthermore, fuel is the most costly item in an airline's annual expenses. Airline profit margins are slim at best, so any and all efforts must be used to reduce fuel consumption. Aircraft CG location affects the amount of fuel the aircraft burns. If an aircraft is loaded with the CG positioned towards the forward limit of the aircraft's CG envelope, the pilot must add rear stabilizer trim for the nose-heavy aircraft. This additional rear stabilizer trim will increase the aerodynamic drag on the aircraft, thus burn more fuel. If an aircraft can be loaded with the aircraft CG positioned near the aft limit of the aircraft CG envelope, the aircraft will require less trim and be more fuel efficient.

In a search of the prior art, there are numerous onboard aircraft weighing systems which measure aircraft weight. The measured aircraft weight is subsequently used to determine aircraft CG. Research of the prior art to identify automatic aircraft weighing systems are well documented and reference may be made to United States patents:

U.S. Pat. No. 3,513,300—Elfenbein U.S. Pat. No. 5,548,517—Nance
U.S. Pat. No. 3,584,503—Senour U.S. Pat. No. 6,128,951—Nance
U.S. Pat. No. 3,701,279—Harris U.S. Pat. No. 6,237,406—Nance
U.S. Pat. No. 5,214,586—Nance U.S. Pat. No. 6,237,407—Nance
U.S. Pat. No. 5,521,827—Lindberg U.S. Pat. No. 7,967,244—Long The prior art described by these patents explain mechanical apparatus added to a landing gear strut which measure the weight of the aircraft. Typical aircraft used in day-to-day airline operations are commonly supported by a plurality of compressible, telescopic landing gear struts. These landing gear struts contain pressurized hydraulic fluid and nitrogen gas. The weight of the aircraft rests upon and is supported by "pockets" of compressed nitrogen gas, within the landing gear struts. Aircraft weight supported by these pockets of gas is called the "sprung" weight. There is additional aircraft weight which is not identified by changes in landing gear strut pressure. This additional weight is associated with various landing gear components located below the pockets of compressed gas including such items as the wheels, tires, brakes, strut piston, and other lower landing gear components. Aircraft weight associated with these lower landing gear components located below the pockets of compressed gas is called the "unsprung" weight. Unsprung weight remains a relatively constant weight. Aircraft brake wear and tire wear result in a minimal and virtually insignificant amount of weight loss to the unsprung weight. The unsprung weight is typically added to the sprung weight, to identify total aircraft weight.

The methods of prior art aircraft weighing systems, determine the "sprung" weight of the aircraft by measuring the pressure within the landing gear struts and multiplying strut pressure by the load supporting surface area of the strut piston. Among the disadvantages of the prior art onboard aircraft weight measuring systems are that airlines can suffer severe schedule disruptions by using a "measured" aircraft weight value, as opposed to methods of "calculating" aircraft weight based upon FAA approved "assumed" weights, of varying weight items such as airline passengers and baggage, loaded onto the aircraft.

Aircraft load planning is a crucial part of keeping an airline running on schedule. A scheduled aircraft departure will commence its load planning process up to one year prior to the actual flight. Airlines do not offer ticket sales for a flight, more than twelve months prior to the flight. As each ticket for a scheduled flight is purchased, the average passenger and average bag weights are assigned into a computer program, continually updating throughout the year the planned load for that flight. Aircraft have a maximum design take-off weight limitation, where airline operations use assumptions as to the weight of passengers and baggage loaded onto the aircraft, to stay below the aircraft take-off weight limitation. The Federal Aviation Administration has published an Advisory Circular "AC 120-27E" which designates the approved weight assumptions for airline passengers and baggage:

| | |
|---|---:|
| Average passenger weight - summer | 190.0 lbs |
| Average passenger weight - winter | 195.0 lbs |
| Average bag weight | 28.9 lbs |
| Average heavy bag weight | 58.7 lbs |

Historical weather patterns regarding wind velocity and direction, along with storm patterns along scheduled airline routes are also considered when planning the amount of fuel that will be consumed for a potential flight. On the actual day of a flight, typically two hours prior to the departure of that flight, the airline's automated load planning program will be transferred to the desktop computer display of one of the airline's Flight Dispatchers. It is the responsibility of the Flight Dispatcher to then monitor the planned load of that flight as passengers check-in at the gate. Typically this process goes without interruption and the aircraft will dispatch on schedule, as planned. As the door of the aircraft is closed and the load is closed-out by the Flight Dispatcher, the planned load will always match the departure load, as submitted to the FAA, because both are based on the same compilation of weight assumptions. If there were a system onboard the aircraft that measures the aircraft weight, just as the aircraft door closes, and the measured weight did not match the calculated weight, the airline would be forced to take a departure delay to resolve the differential in the two separate but parallel weight determination processes. This potential for delay in the flight departure, on as many as 2,200 daily flights for a single airline, results in the various airlines not willing to take the risk of hundreds of flight delays. Airlines currently dispatch their aircraft under FAA approved procedures; a method which helps keep the airlines on schedule. This creates an incentive for airlines to continue to use the FAA approved assumed weights, irregardless to whether the assumed aircraft weight determination is accurate.

Airlines would appreciate an opportunity to use the CG tracking capabilities of today's aircraft weight and balance systems to more efficiently place baggage and cargo below decks, and take advantage of the reduced fuel consumption benefits, but are not willing to take the risk of scheduled departure delays when the aircraft's planned weight, built upon weight assumptions, does not match the aircraft's actual measured weight.

The methods described herein are applicable as alternatives to existing prior art aircraft weight and balance measuring systems for determining aircraft CG, independent of measuring the aircraft weight.

SUMMARY OF THE INVENTION

It is the object of the present invention to provide a method to measure aircraft CG, without any requirement to measure the aircraft weight.

The method determines the center of gravity of an aircraft on the ground and having main landing gear struts and a nose landing gear strut, each of the main and nose landing gears supporting a respective aircraft load when the aircraft is on the ground. The method measures the load supported by each of the main landing gear struts and measures the load supported by the nose landing gear strut. The measured loads on the main landing gear struts are combined. The measured load on the nose landing gear strut is compared to the combined measured loads on the main landing gear struts and the aircraft center of gravity is determined from the comparison. The weight of the aircraft is determined independently of the measured loads on the main and nose landing gear struts.

In accordance with another aspect, the aircraft is dispatched for a flight using the determined aircraft center of gravity and the independently determined aircraft weight.

In accordance with another aspect, the step of determining the weight of the aircraft independently of the measured loads on the main and nose landing gear struts further comprises the step of using assumptions of weight for passengers and baggage In accordance with one aspect, the step of determining the aircraft center of gravity further comprises referring to a look-up table.

In accordance with another aspect, the step of measuring the load supported by each of the main landing gear struts further comprises the step of measuring a pressure of each of the main landing gear struts. The step of measuring the load of the nose landing gear strut further comprises the step of measuring a pressure supported by the nose landing gear strut. The step of comparing the measured loads of the main struts and the nose strut further comprises the step of comparing the measured pressures of the main struts and the pressure of the nose strut.

In accordance with another aspect, each of the nose and main landing gears struts have an axle. The step of measuring a load supported by each of the main landing gear struts further comprises the step of measuring a deflection in each of the main landing gear axles. The step of measuring a load supported by the nose landing gear strut further comprises the step of measuring a deflection in the nose landing gear strut axle. The step of comparing the measured loads of the main struts and the nose strut further comprises the step of comparing the measured deflections of the main strut axles and the deflection of the nose strut axle.

In another aspect, the step of determining the aircraft center of gravity further comprises the step of determining the aircraft center of gravity as a % MAC.

In another aspect, the step of determining the aircraft center of gravity further comprises the step of determining the aircraft center of gravity as a distance relative to an aircraft station number.

In another aspect, the step of determining the aircraft center of gravity further comprises the step of determining a location of the center of gravity laterally, relative to a longitudinal axis of the aircraft.

In another aspect, the nose landing gear strut is smaller than each of the main landing gear struts. The method further comprises the step of adjusting the load measurement on the nose landing gear strut to compensate for the smaller size of the nose landing gear strut.

In another aspect, after dispatching the aircraft for a flight, the aircraft takes off.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

DETAILED DESCRIPTION OF THE PREFERRED EMBODIMENT

Figure 1:
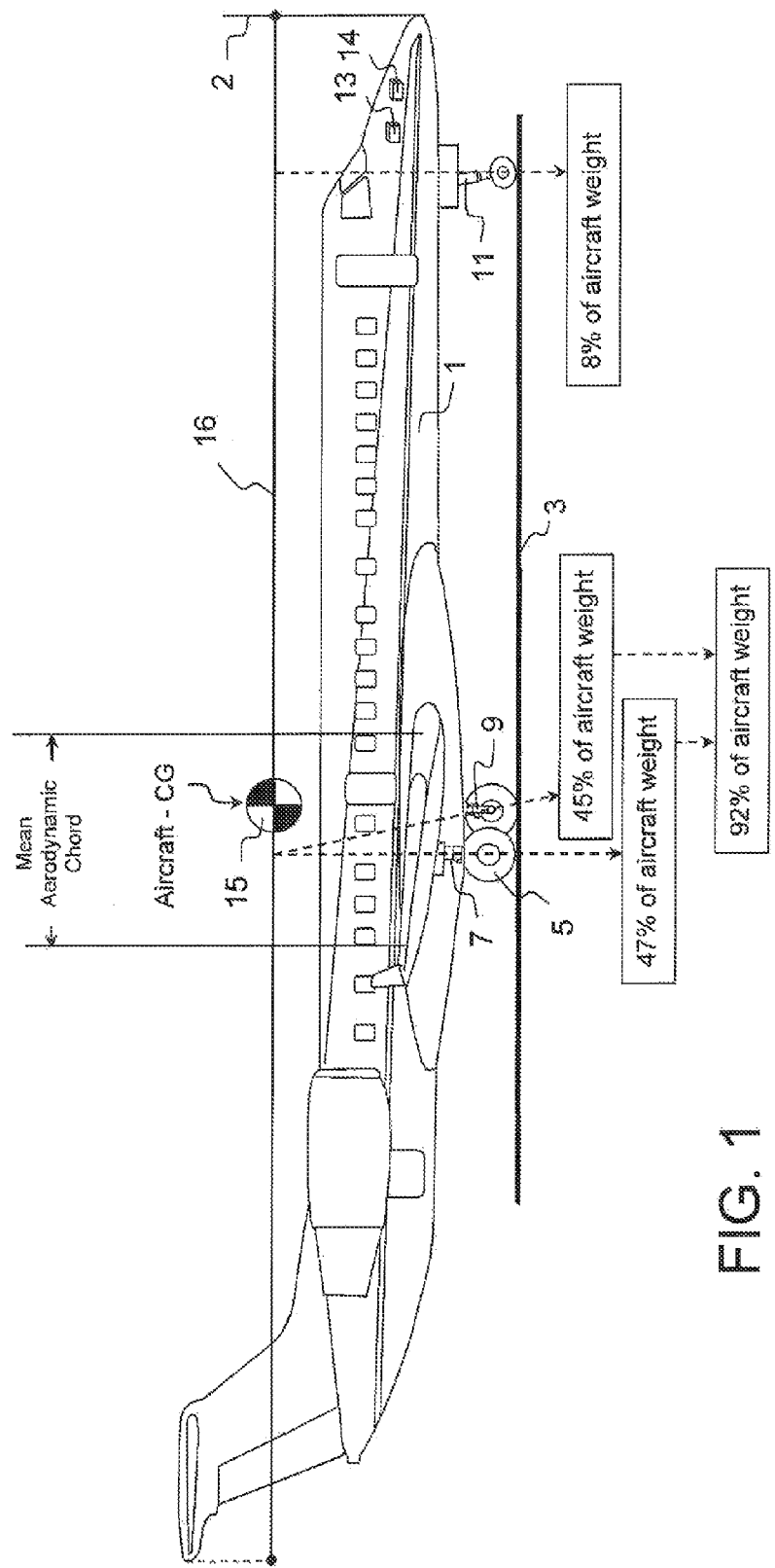
FIG. 1 is a side view of a typical regional aircraft, with a tricycle type landing gear in the extended position, supporting the weight of the aircraft, resting on the ground, illustrating the location of the aircraft longitudinal CG, and the aircraft Mean Aerodynamic Chord hereinafter referred to as MAC, along with various components of the preferred embodiment.

An aircraft is typically supported by plural landing gear struts. In many if not most cases, the aircraft is supported by three landing gear struts. Each landing gear strut is designed much like and incorporates many of the features of a telescopic shock absorber. The shock absorber of the landing gear strut comprises internal fluids of both hydraulic oil and compressed nitrogen gas. More simply said the weight of an aircraft rests on three pockets of compressed nitrogen gas. Pressure contained within the landing gear struts is measured in "psi".

The present invention offers a method to determine aircraft Center of Gravity (CG) by measurement of strut loads, independent of determining the aircraft weight. Tracking the aircraft CG can be accomplished by determining the relationship or a ratio of the load on the nose landing gear as compared to the loads on the main landing gear. By measuring the load on the nose landing gear and the loads on the main landing gear, combining the load measurements on the two main landing gears, and then relating the nose load to the combined main loads, the aircraft CG can be determined. The load measurements could be used in the further calculation of supported weight, but in this system the load measurements are not used to calculate the aircraft weight, but rather only to identify aircraft CG. Other methods are used to determine aircraft weight. Typically the nose landing gear supports about 8%-14% of the aircraft load, where the remainder of the load is supported by the combined main landing gear. For example, a look-up table can be used to compare the load on the nose landing gear to the loads on the main landing gear.

In addition, the nose landing gear is smaller than each of the main landing gears, so some compensation may be applied. For example, each of the two opposing main landing gear struts have identical load supporting surface area dimensions, where the smaller nose landing gear strut is typically sized to about 30% of the load supporting surface area, as compared to each of the main landing gear struts. For pressure measurements, the internal gas pressure contained within the nose landing gear strut, is adjusted for size and compared to the combined pressure contained within both main landing gear struts. As aircraft CG moves either forward or aft, the relationship or ratio of nose landing gear pressure as related to combined main landing gear pressures will change in direct relation to the change in aircraft CG. As a means to further identify the load differential between main land gear and nose landing gear, the internal gas pressure contained within the nose landing gear strut, may be adjusted for size and compared to the combined pressure container within both main landing gear struts. By measuring the internal gas pressure within each landing gear strut, and applying a adjustment/reduction value to the nose gear pressure, which adjustment/reduction value is proportional to the smaller load supporting surface area within the nose landing gear; then comparing the adjusted nose landing gear pressure to the combined main landing gear pressure, the aircraft CG can be measured and identified without the need to determine aircraft weight.

Alternative measurements of strut loads may be used. For example, the present invention offers a method to determine aircraft CG by measurement of landing gear strut component yielding/bending by attached strain gauge sensors. Such measurements do not require the determination of aircraft weight. As still another alternative, optical or range sensors can be used to determine landing gear strut extension and compression, and the loads borne by the struts.

Referring now to the drawings, wherein like reference numerals designate corresponding parts throughout the several views and more particularly to FIG. 1 thereof, there is shown a typical regional aircraft 1. All variations of aircraft are required to have a vertical "datum line" 2 which is a non-changeable reference point, designated by the aircraft manufacturer, which is used in calculations of the aircraft CG 15. (The CG 15 is located inside of the aircraft 1, but in this illustration is shown above aircraft 1, for better visibility.) Aircraft CG 15, as measured along aircraft longitudinal axis 16, can be referenced in various ways by different airline operations. As an example, units of measure can be referenced in inches or in centimeters, measured aft of the aircraft datum line 2. This form of reference is referred to as the CG 15 located at a particular "station number" for the aircraft 1. As an additional example, the location of aircraft CG 15 may be referenced at a location measured as a percentage of the distance from the leading edge of the aircraft's Mean Aerodynamic Chord (% MAC).

The MAC is the average (Mean) width of the wing's lifting surface (Aerodynamic Chord). In the case of a swept-wing aircraft 1, the leading edge of the MAC is locative just aft of the leading edge of the wing where it attaches to the aircraft 1. The trailing edge of the MAC is located just forward of the aft wing-tip. Airline operations often reference the aircraft CG location as a point some percentage aft of the forward edge of the mean aerodynamic chord, or as % MAC.

Aircraft 1 has a tricycle landing gear configuration consisting of a nose landing gear 11, and also shown two identical main landing gears including a right main landing gear 7 and a left main landing gear 9. Main landing gears 7 and 9 are located at the same point along the aircraft's horizontal axis 16, but for convenience in this illustration, are shown in a perspective view for this FIG. 1. Main landing gear 7 and 9 typically support an equalized amount of weight, but in this example where an aircraft fuel load imbalance has distributed more fuel into the starboard/right wing-tank than the port/left wing-tank, causes an unbalanced amount of weight applied to main landing gear 7 and 9, thus the illustration showing 47% of the aircraft weight assigned to right main landing gear 7 and 45% of the aircraft weight assigned to left main landing gear 9 with the remaining 8% is supported by nose gear 11.

Landing gear 7, 9 and 11 incorporate one or more tires 5 to distribute the weight of aircraft 1 which is resting on the ground 3. Electronic elements which together are used in this invention, and are attached to aircraft 1, are an aircraft CG 15 measurement computer 13, aircraft inclinometer 14, landing gear strut pressure sensors 21 with embedded temperature probes (shown in FIG. 2 and FIG. 4), and landing gear axle deflection strain gauge sensors 22 (shown in FIG. 2 and FIG. 4). The pressure sensors measure internal strut pressure. Computer 13 contains various internal circuit boards for processing calculations for aircraft CG 15, and makes refinements in calculation of aircraft CG 15, from possible variation in aircraft 1 incline, due to possible slope in ground 3.

Although the aircraft shown in FIG. 1 is a regional aircraft, the depiction of regional aircraft is by way of an example, as the apparatus and methods described herein can be used on most types of aircraft which utilize pressurized, telescopic landing gear struts.

Figure 2:
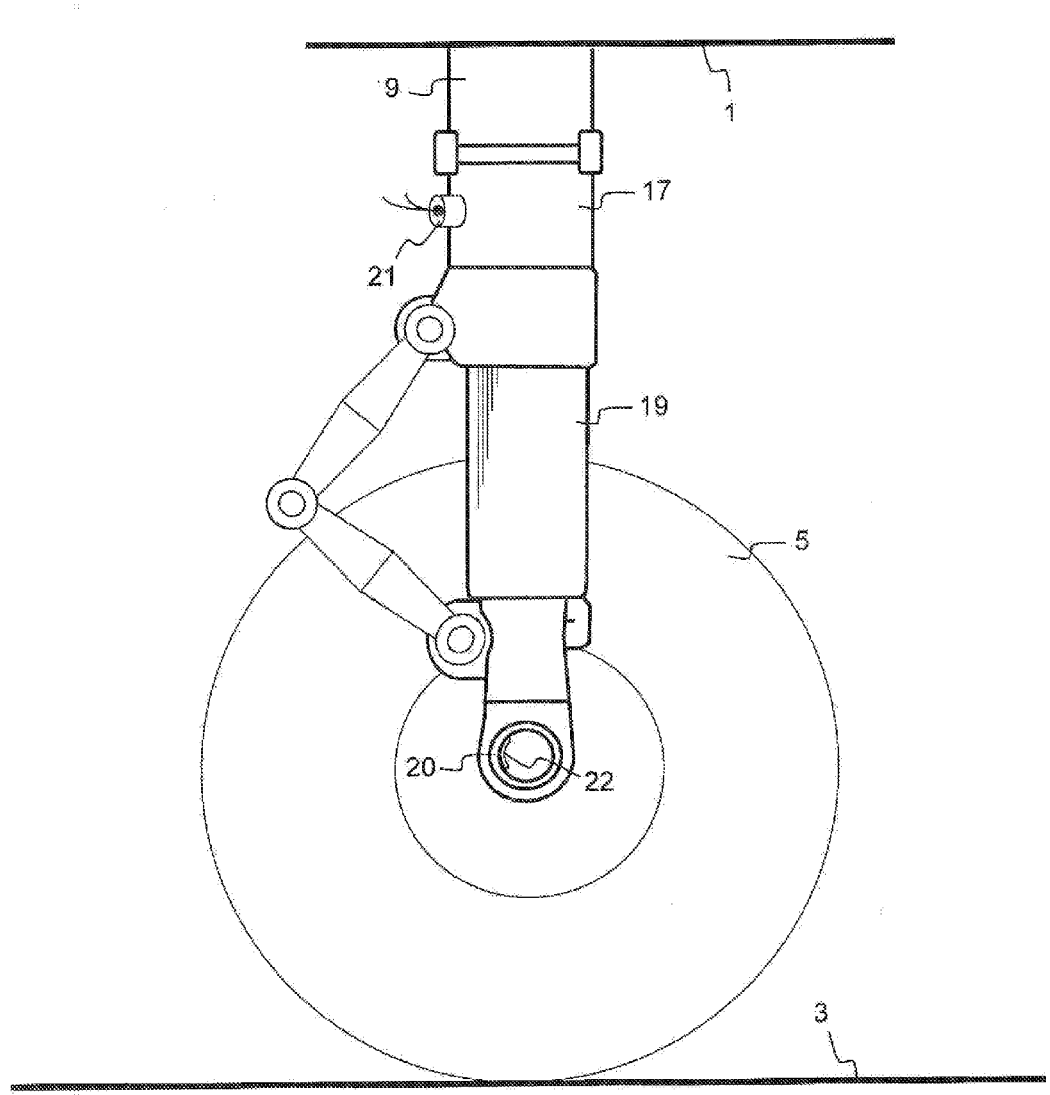
FIG. 2 is a side view of a typical aircraft telescopic landing gear strut, with various elements of the preferred embodiment attached to the landing gear strut.

Referring now to FIG. 2 there is shown a side view of a typical aircraft telescopic landing gear strut 9, further identifying landing gear strut cylinder 17, in which strut piston 19 moves telescopically within strut cylinder 17. Pressure and temperature within main landing gear 9 is monitored by a pressure/temperature sensor 21. Load from tire 5 is transferred to piston 19 through axle 20. Deflection of axle 20 is measured by strain gauge sensor 22.

Figure 3:
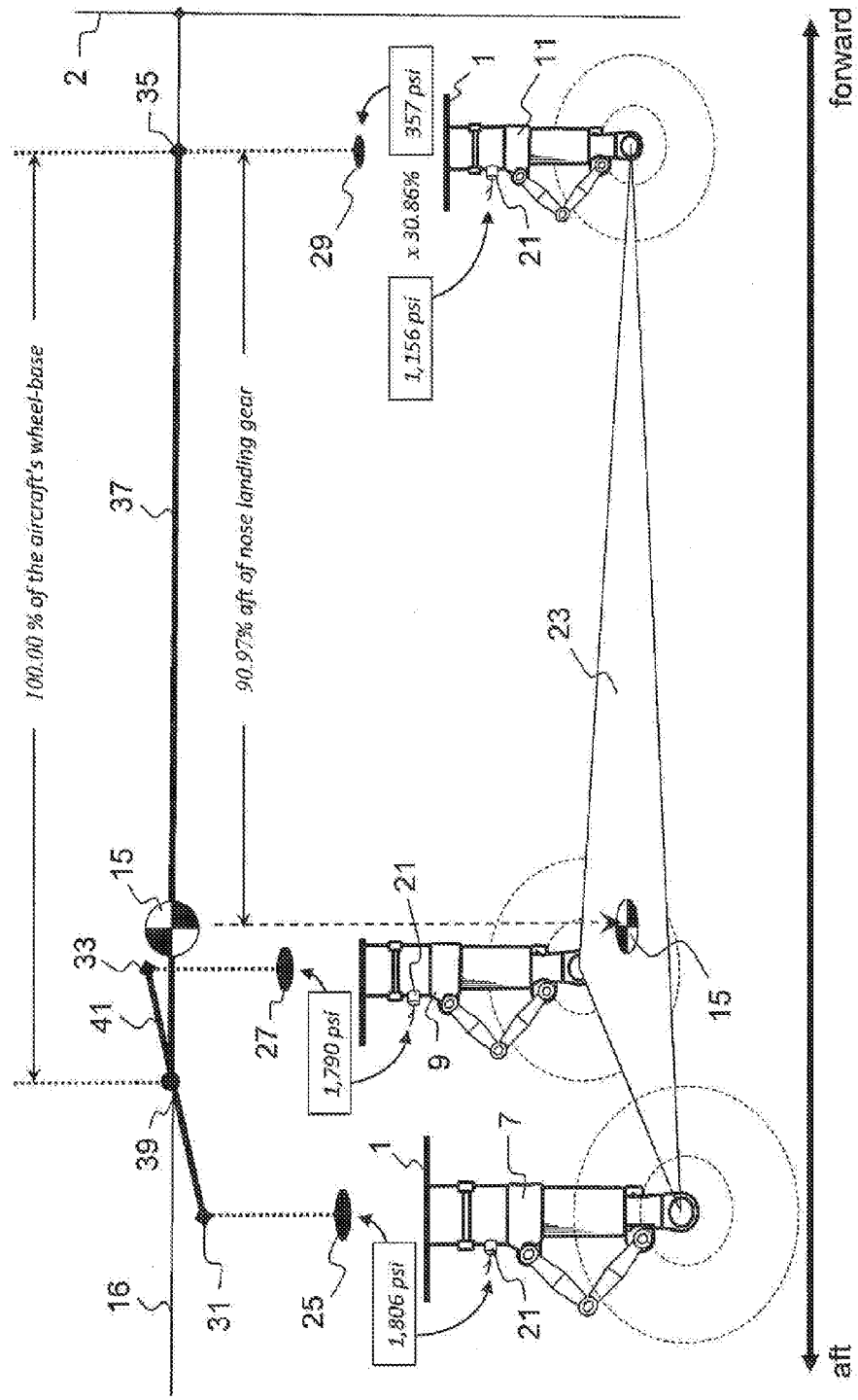
FIG. 3 is a perspective view of the aircraft landing gear footprint, and how the aircraft CG is calculated.

Referring now to FIG. 3, there is shown a perspective view of the aircraft's 1 landing gear footprint, being nose landing gear 11 in relation to right main landing gear 7 and left main landing gear 9, and how the three corners of an imaginary triangular horizontal plane 23 are created by the three landing gear struts 7, 9 and 11. The corners of the horizontal plane 23 are located at a reference point on each strut, such as the vertical center-line of the wheel axles.

Located directly above right main landing gear 7 is a black circle 25 (shown in this perspective view as an oval) which represents the load supporting surface area of the piston within right main landing gear strut 7. Located directly above left main landing gear 9 is a black circle 27 (shown as an oval) which represents the load supporting surface area of the piston within left main landing gear strut 9. Located directly above the nose landing gear 11 is a smaller black circle 29 (shown as an oval) which represents the lesser amount of load supporting surface area of the piston within the smaller nose landing gear strut 11. The circles 25, 27 and their associated pistons are of equal size to one another, while the circle 29 and its associated piston is smaller in size.

Located directly above right main landing gear black circle 25 is reference point 31 which represents the geographic center of the load supporting surface area within right main landing gear strut 7. Located directly above left main landing gear black circle 27 is reference point 33 which represents the geographic center of the load supporting surface area within left main landing gear strut 9. Located directly above nose landing gear black circle 29 is reference point 35 which represents the geographic center of the load supporting surface area within nose landing gear strut 11. The position of point 35, which is located aft from the datum line 2 (also shown in FIG. 1), is a known value. Line 37 extends along and parallel to the aircraft's horizontal axis 16 and intersects line 41 at point 39 which identifies a location that is equal-distance between right main landing gear 7 and left main landing gear 9. Line 41 is perpendicular to line 37. Though line 37 and aircraft's horizontal axis 16 are coaxial or parallel, line 37 is the measured distance between nose gear 11 and the perpendicular line 41 between main landing gears 7 and 9.

In FIG. 3, the black and white patterned disk representing aircraft CG 15 identifies the longitudinal location of aircraft CG 15 along line 37. In addition to identifying the aircraft's longitudinal CG 15, a determination is made of main strut pressure asymmetry by comparing the pressure of right main landing gear 7 to the pressure of left main landing gear 9. The lateral location of the CG 15 is tracked and may be identified off-center from the aircraft's longitudinal axis 16. CG 15 is also monitored as it moves (or a projection thereof) laterally across horizontal plane 23.

The aircraft CG 15 is measured using the relationships of aircraft landing gear strut pressures alone, as opposed to the determination of the aircraft's measured weight. It shall be assumed all strut pressure measurements will be corrected for variations in temperature, as measured by a temperature probe feature of pressure sensor 21. Aircraft landing gear struts are designed for various loads and endurance. The main landing gear is designed to withstand the extreme loads associate with very hard landing events, thus the main landing gear must be sized larger, to withstand extreme landing loads. The nose landing gear absorb much less of the landing loads during each landing event, where the responsibility of the nose landing gear is for basic aircraft balance of about 8-14% of the aircraft weight; and used to steer the aircraft while on the ground. The differential in size between the main landing gear struts and the nose landing gear strut requires the measured pressure from the nose landing gear strut to be adjusted in the determination of aircraft CG when using strut pressure alone. Considering the aircraft nose landing gear 11 is smaller than either main landing gear 7 or 9, a typical calculation of CG 15 through direct comparison of measured "psi" values from the three respective landing gear struts would find error in the CG 15 determination. Adjusting or compensating for the reduced load supporting surface area of the nose landing gear, as illustrated by the smaller black circle 29, allows for determining aircraft CG 15 using strut pressure alone, without measuring the weight of the aircraft.

In the preferred embodiment, the method for determining a correct nose gear strut 11 pressure adjustment/reduction value is to divide the load supporting area of the nose landing gear strut (as represented by circle 29), by and as a percentage of the load supporting surface area of either main landing gear strut 7 or 9 (as represented by circle 25 or 27) to create a proper adjustment/reduction value for nose gear strut 11 pressure.

$$SA_N \div SA_{RM} = ADJ_N\%$$

where $SA_N$ is the load supporting area within the nose strut;

$SA_{RM}$ is the load supporting area within the right main strut (left main strut could be used);

$ADJ_N\%$ is the adjustment value to be applied to measured nose strut pressure.

The adjustment factor $ADJ_N\%$ need only be determined once for the aircraft, unless the landing gear load supporting dimensions are changed. The adjustment factor $ADJ_N\%$ is used every time CG is determined.

To determine CG, the pressure of the nose strut is then adjusted:

$$P_N \times ADJ_N\% = P_{NADJ}$$

where $P_N$ is the measured strut pressure within the nose strut;

$P_{NADJ}$ is the adjusted strut pressure assigned to the nose landing gear strut.

The pressures of the main struts are totaled:

$$P_{RM} + P_{LM} = P_{MTOTAL}$$

where $P_{RM}$ is the measured strut pressure within the right main strut;

$P_{LM}$ is the measured strut pressure within the left main strut;

$P_{MTOTAL}$ is the total pressure of the main struts.

An adjusted total strut pressure is determined:

$$P_{MTOTAL} + P_{NADJ} = P_{ADJTOTAL}$$

where $P_{ADJTOTAL}$ is the total pressure of the combined main gear struts plus the adjusted pressures of the nose gear strut.

The center of gravity is determined:

$$P_{MTOTAL} \div P_{ADJTOTAL}\% = CG$$

Continuing with the example, the diameter of the main piston is 6.3 inches and the diameter of the nose piston is 3.5 inches:

$$SA_N \div SA_{RM} = ADJ_N\%$$

$$9.62 \text{ in}^2 \div 31.17 \text{ in}^2 = 30.86\%$$

$$1{,}156 \times 30.86\% = 357 \text{ psi} = P_{NADJ}$$

where 1,156 is the measured pressure within the nose landing gear and 357 is the adjusted pressure.

As illustrated in FIG. 3, 100% represents the full wheel base, or distance between points 35 and 39. The aircraft CG 15 is located 90.97% aft of point 35 (of the aircraft wheel base), where aircraft CG 15 is located 90.97% along the measured length of line 37. Point 35 is the center of nose gear 11. The length of line 37, from point 35 to point 39, does not change. The offset, or distance, from point 35 to the datum line 2 is known, thus the location of CG 15 is relative to the datum line, and can be determined.

The "adjusted pressure value" of 357 psi for the nose landing gear strut pressure is required to correctly determine the location of aircraft CG when using strut pressure alone. Determination of aircraft CG is a function of identifying and applying the ratio of the adjusted nose landing gear strut pressure, as compared to combined main landing gear strut pressures where:

$P_{RM}$=Pressure of the Right Main landing gear strut
$P_{LM}$=Pressure of the Left Main landing gear strut
$P_{MTOTAL}$=Pressure of the Total Main landing gear struts
1,806 psi=$P_{RM}$
1,790 psi=$P_{LM}$
1,806 psi+1,790 psi=3,596 psi=$P_{MTOTAL}$
3,596 psi+357 psi=3,953 psi=$P_{ADJTOTAL}$
3,596 psi÷3,953 psi=90.97%=CG location, aft of Nose landing gear strut The determined CG location is a percentage of the distance from the nose landing gear, to the location of the main landing gear. To make this CG determination which is based on aircraft wheel-base dimension more practical for use by an airline operator, the CG determination may be converted into a value of % MAC, which is a corresponding value in reference to a point associated a percentage value located aft of the leading edge of the aircraft's Mean Aerodynamic Chord. A simple look-up table is created which relates % wheel-base to that of % MAC. Additionally a simple look-up table is created which relates % wheel-base to that of a corresponding value in relation to an aircraft station number. The look-up table is obtained from a range of pressure measurements taken from the main and nose landing gear, during the initial calibration of the system, while the aircraft is resting on weight measuring scales. The scales are used in the initial calibration process, but are not needed in subsequent aircraft CG determinations by reference to the created look-up table. The look-up table can be updated while the aircraft is in operation, by extrapolating from initial calibration data to the load ratios experienced at the time a CG determination is desired.

Still another look-up table can be created and used to determine CG from the measured loads on the struts. The look-up table is obtained from a range of pressure measurements taken from the main and nose landing gear, during the initial calibration of the system, while the aircraft is resting on weight measuring scales. The scales are used in the initial calibration process, but are not needed in subsequent aircraft CG determinations by reference to the created look-up table. The look-up table can be updated while the aircraft is in operation, by extrapolating from initial calibration data to the load ratios experienced at the time a CG determination is desired.

The location of the CG 15 which may be off-center to the longitudinal axis 16 is determined by identification of the differential in pressure measurements of the main landing gears 7 and 9. A differential of zero locates the CG 15 as along the longitudinal axis 16. A higher pressure on one main strut locates the CG 15 on that side of the axis 16, by a distance proportional to the magnitude of pressure differential. A look up table can be used to determine the lateral location of the CG relative to the line 37.

Figure 4:
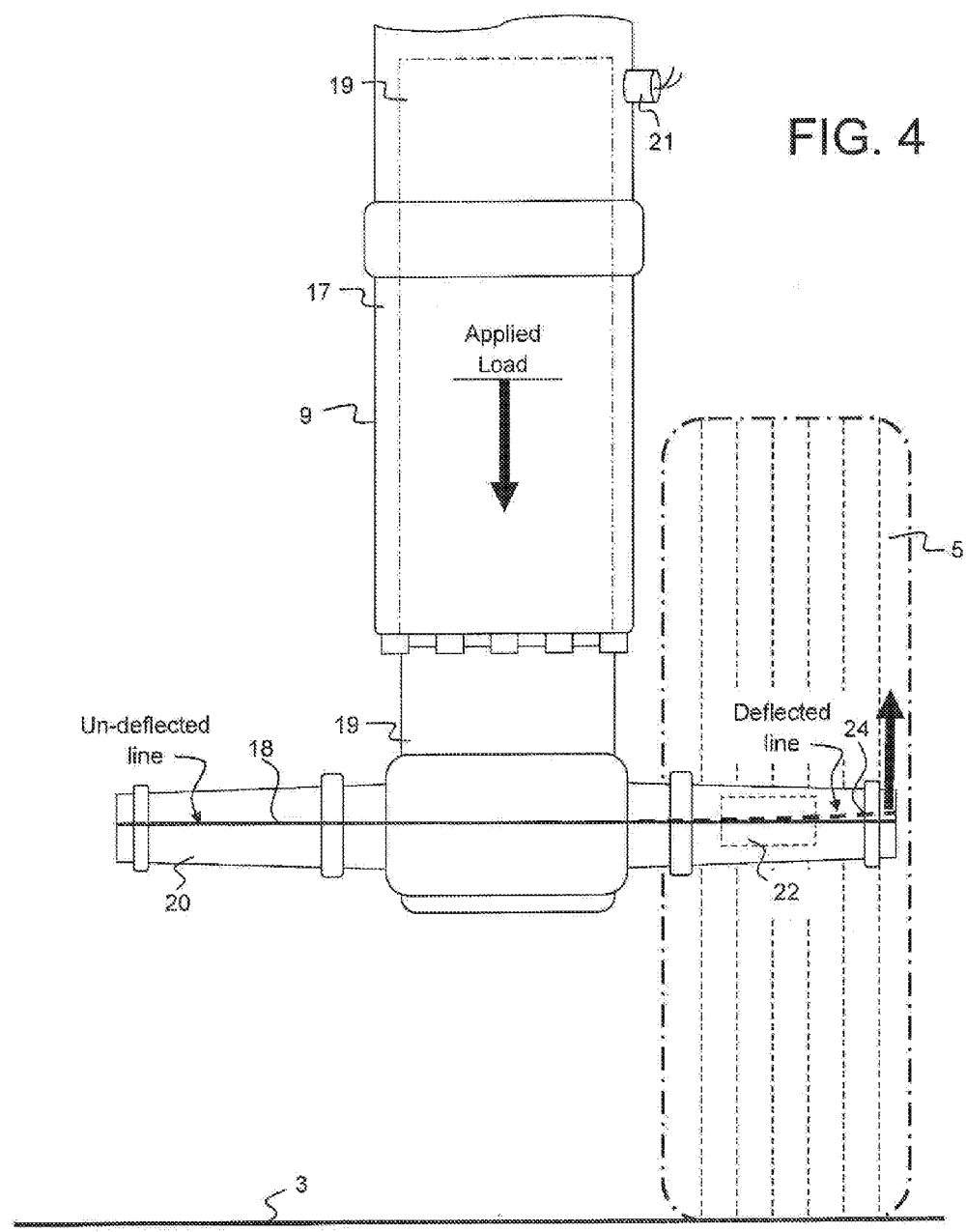
FIG. 4 is a front view of a typical aircraft telescopic landing gear strut, with various elements of the preferred embodiment attached to the landing gear strut.

Referring now to FIG. 4 there is shown a front view of a typical aircraft telescopic landing gear strut 9 further identifying landing gear strut cylinder 17, in which strut piston 19 moves telescopically within strut cylinder 17. Landing gear strut piston 19 uses axle 20 to allow tire 5 to transfer aircraft load to the ground 3. Pressure within main landing gear 9 is monitored by a pressure sensor 21. Pressure measured by pressure sensor 21 is proportional to the amount of applied load onto landing gear 9. The applied load to landing gear 9 can also be measured by an axle deflection sensor 22. Axle deflection sensor 22 can be of the strain gauge variety, which measures the vertical deflection of axle 20. A bold solid line 18 is shown running horizontal across the center-line of landing gear axle 20 and represents an un-deflected posture of the landing gear axle 20. As load is applied, axle 20 will deflect. A bold dashed line 24 representing deflection of axle 20 is shown running adjacent to the un-deflected bold solid line 18. The amount of deflection of landing gear axle 20 is directly proportional to the amount of load applied. As load is applied to strut 9, the increase in load will be immediately sensed by strain gauge sensor 22.

As previously described in FIG. 3, the main landing gear are larger than the nose landing gear. This pattern continues with the sizing of landing gear axle 20. The nose landing gear axle 20 is smaller than the main landing gear axle 20. Strain gauge sensor 22 measures the vertical deflection of axle 20, where the amount of axle deflection is equivalent to the amount of applied load.

In a similar manner to the nose strut pressure adjustment previously described, an adjustment value is used to refine the measured deflection from the nose strain gauge sensor 22. As strain gauge sensor 22 deflects under load, represented by axle 20 deflection, the output from strain gauge sensor 22 will change. Measured deflection changes from nose gear sensor 22 are adjusted, to compensate for the smaller size of the nose landing gear axle, as compared to the size of the main landing gear axle. Strain gauge sensor 22 will transmit the output deflection signal to the system computer 13 (shown in FIG. 1 and described in FIG. 5). A software look-up table is generated to correct measured deflection values received from nose strut sensor 22, for the further determination of aircraft CG.

Typically, in prior art weight and balance systems, the deflection transmitted from strain gauge sensor 22 is converted to an amount equivalent to the applied weight, at each landing gear strut. In the present invention, the measured axle deflection from the nose landing gear is adjusted, then compared directly to the measured axle deflection of the combined main landing gear, where the measured deflection of the nose gear axle will be corrected in proportion to the reduced size of the nose gear axle, as compared to the main landing gear axle, to further determine aircraft CG.

Figure 5:
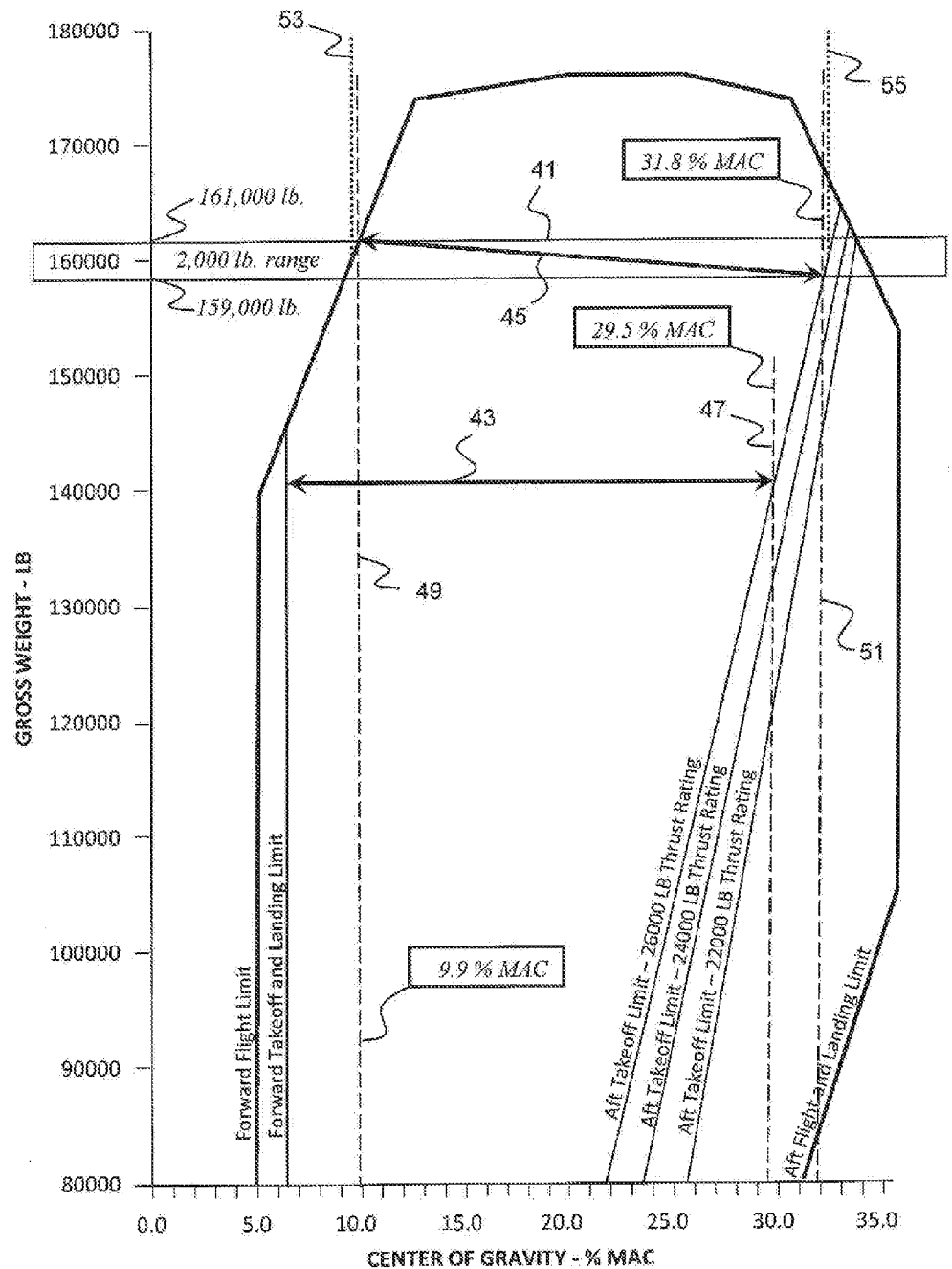
FIG. 5 is an example weight and balance control and loading chart.

Referring now to FIG. 5, there is shown an example of the Boeing 737-800 "WEIGHT AND BALANCE CONTROL AND LOADING MANUAL" chart, typically referred to as the aircraft weight and CG envelope. The weight and CG envelope define the forward and aft CG limitations in which the aircraft can safely operate. The forward and aft CG limits of safe operation will vary depending on the amount of aircraft weight, and the amount of engine thrust used during the takeoff roll.

As previously described, many airlines determine aircraft weight using assumed weight values based on historical weight data for various items such as passengers, baggage and cargo loaded onto the aircraft, where the pre-determined and measured empty aircraft weight is associated with the sum of the assumed weights of the accumulated items loaded onto the aircraft, without the need to physically place the aircraft on weighing scales.

An acceptable "range" of aircraft weight can be associated with variations in landing gear strut pressures. The aircraft is placed onto aircraft weighing scales which measure the weight supported at each respective landing gear strut. The measured pressure from each respective landing gear strut is recorded and stored within a look-up table, as each respective pressure relates to the weight recorded by each respective scale. While the aircraft remains on scales, the aircraft weight is increased and decreased creating different strut pressures to corresponding scale measurements. The look-up table is expanded to a determine aircraft weight ranges from the lower empty weight of the aircraft, up to the higher maximum take-off weight of the aircraft. This look-up table creates a data-base of aircraft weight range determinations as they relate to associated pressures within each landing gear strut. Subsequently when the aircraft is in daily operations, the aircraft CG is measured as described in FIG. 3, and a range of aircraft weight is determined from the respective landing gear struts pressures, to further verify the measure aircraft CG is located within the associated limitations of the current aircraft weight range.

As an example, the horizontal line 43 illustrates the forward and aft CG limitations of an aircraft having an accurate or measured weight of 140,000 pounds. The forward CG limitation of 6.5% MAC, illustrated by the "Forward Takeoff and Landing Limit" line; and an aft CG limit of 29.5% MAC, illustrated by vertical dashed line 47 (with a thrust rating of 26,000 pounds).

As an alternate example, the aircraft weight can be determined within an acceptable range for the further determination of acceptable CG limitations within FAA Regulatory requirements; but such weight determination would not be accurate enough, thus unacceptable to FAA Regulatory requirements as a means to measure aircraft weight prior to take-off for a flight. For this example the weight range is 160,000 lb., where box 41 illustrates a range of 2,000 lb. representing a potential error of ±1,000 lb. in the aircraft weight determination. The forward and aft CG limitations are illustrated by the bold diagonal line 45, having a forward CG limit of 9.9% MAC, illustrated by vertical dashed line 49 and an aft CG limit of 31.8% MAC, illustrated by vertical dashed line 51. Line 45 is shown as diagonal due to a curtailment of the forward and aft CG limits associated with the ±1,000 lb. range of the weight determination. Vertical dotted line 53 illustrates the forward CG limit for the aircraft with a weight determination of exactly 160,000 lb. Vertical dotted line 55 illustrates the aft CG limit for the aircraft with a weight determination of exactly 160,000 lb. There is negligible difference between the locations of line 53 representing the forward CG limit using accurate aircraft weight, to that of line 49 using an aircraft weight range. There is negligible difference between the locations of line 55 representing the aft CG limit using accurate aircraft weight, to that of line 51 using an aircraft weight range. The negligible difference in determination of forward and aft aircraft CG limitations, based upon determination of the aircraft weight range, allows for aircraft weight determinations be made within some pre-determined acceptable range, resulting is forward and aft CG limitation curtailments which are extremely minimal.

Figure 6:
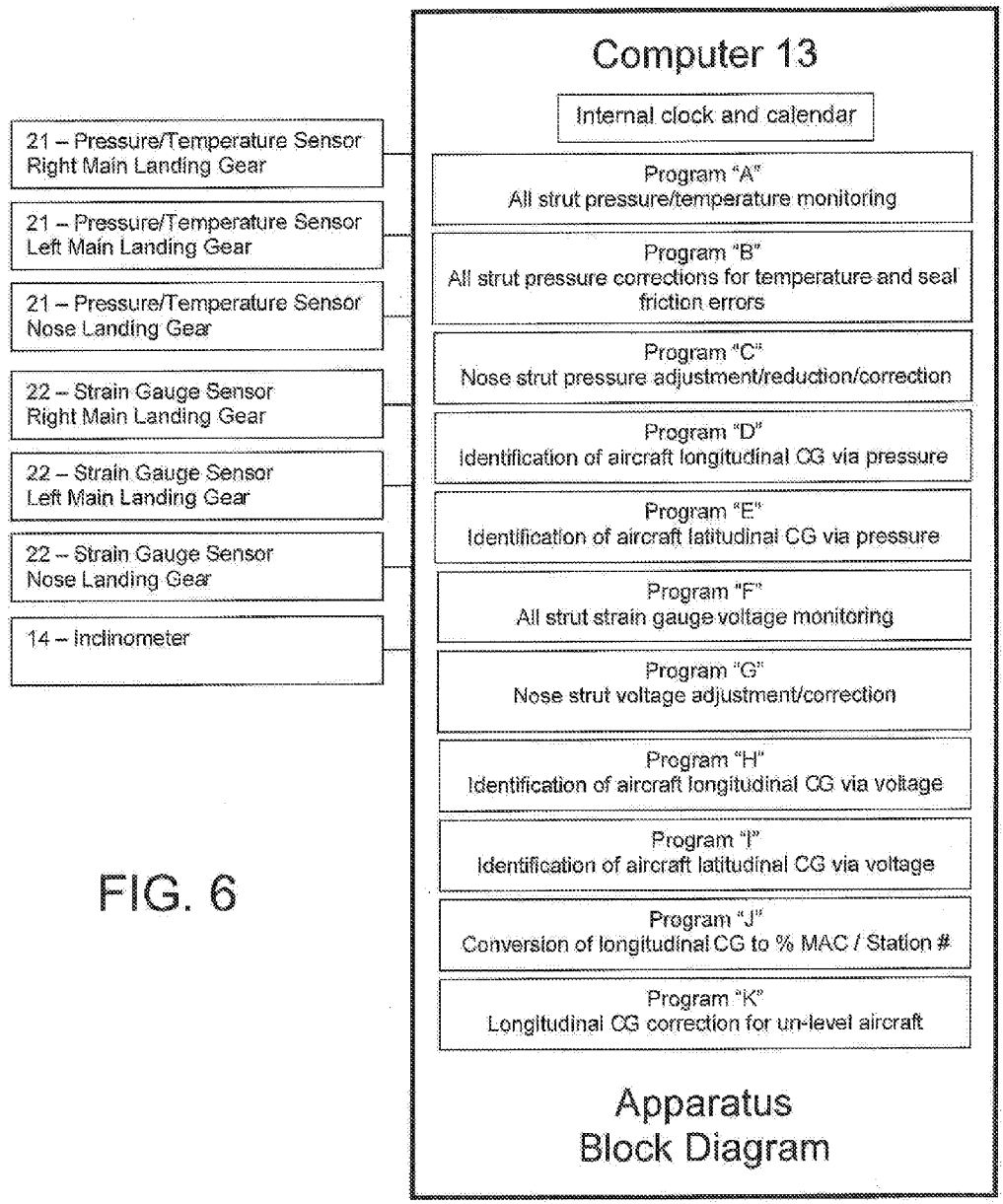
FIG. 6 is a schematic diagram of the onboard computer with sensor inputs that support the CG calculation software programs of this invention.

Referring now to FIG. 6, there is shown a block diagram illustrating the apparatus and software of the invention, with multiple (nose, left-main and right-main landing gear) pressure/temperature sensors 21 which supply landing gear strut pressure/temperature data inputs into CG computer 13. Additionally, multiple (nose, left-main and right-main landing gear) strain gauge sensors 22 supply voltage data inputs corresponding to landing gear strut axle deflection into CG computer 13. Inclinometer 14 monitors any changes in the aircraft angle in relation to horizontal, and supply aircraft angle data as additional inputs to Computer 13. Computer 13 is equipped with an internal clock and calendar to document the time and date of stored data.

Computer 13 has multiple software packages which include:

Program "A"—a software routine for monitoring aircraft landing gear strut pressure/temperature.

Program "B"—a software routine for monitoring aircraft landing gear strut pressure, to further correct pressure distortions related to temperature and landing gear strut seal friction errors. The complete disclosure of U.S. Pat. Nos. 5,214,586 and 5,548,517 are incorporated by reference.

Program "C"—a software routine for adjusting/reducing/connecting the measured nose landing gear strut pressure, as related to a proportional reduction in the size of the nose landing gear strut's load supporting surface area, as compared to the size of a main landing gear strut's load supporting surface area.

Program "D"—a software routine for combining the pressure values associated with each main landing gear strut, as compared to the adjusted pressure of the nose landing gear strut, to further calculate and identify the aircraft longitudinal CG.

Program "E"—a software routine for identifying differential pressure values associated with each main landing gear strut, to further calculate and identify any asymmetrical pressure from the corresponding main landing gear struts, to further identify aircraft lateral CG.

Program "F"—a software routine for monitoring variations in axle deflections from strain gauge sensors attached to the aircraft landing gear axles.

Program "G"—a software routine for adjusting/correcting the measured deflection representing nose landing gear axle deflection, as related to a proportional adjustment for the smaller size of the nose landing gear axle, when compared to the size of a main landing gear axle.

Program "H"—a software routine for identifying combined deflection values associated with each main landing gear strut, as the total main landing gear deflection is compared to the adjusted voltage of the nose landing gear strut; to further calculate and identify the aircraft longitudinal CG.

Program "I"—a software routine for identifying differential deflection values associated with each main landing gear strut, to further calculate and identify any differential deflection from the corresponding main landing gear struts, to further identify aircraft lateral CG.

Program "J"—a software routine for where a look-up table is generated and subsequently used to convert the measured aircraft CG in relation to a percentage of the distance between the nose landing gear to the main landing gear; to an associated and equivalent value as measured as % MAC, and aircraft Station Number.

Program "K"—a software routine for identifying aircraft incline that is differential from horizontal, then correcting the measured and calculated CG of the un-level aircraft, to that of a level aircraft.

The use of programs "C" and "G", which adjust the measured load of the nose landing gear strut to correct for the smaller size of the nose strut relative to the main struts, is optional. If a look-up table is used to determine CG, the adjustments provided by programs "C" (for pressure measurements) and "G" (for axle deflection measurements) are not required.

In operation, the aircraft is at a location at the airport preparing for its next flight. Typically if the aircraft is taking on passengers and baggage, the aircraft is located at a gate. The aircraft takes on weight in the form of passengers, baggage, cargo and/or fuel.

When the aircraft is ready, it departs the gate, taxis to the runway and then takes off down the runway and begins flight. Most, if not all, commercial aircraft are approved for flight by way of being dispatched. To be approved or dispatched for flight, the takeoff weight of the aircraft is determined to ensure the weight is within the operational limits of the aircraft. Also, the CG is determined to ensure proper location.

To determined aircraft CG, the techniques described above are used. However, to determine aircraft weight, another method, independent of the CG load measurement, is used. An example of a method to determine aircraft weight is to use approved weight assumptions for passengers and their baggage, as discussed in the "Background" section above. In addition to the assumptions regarding passenger weight and baggage weight, the empty weight of the aircraft is known from past measurements on scales. Aircraft are reweighed on a periodic basis to account for changes in empty weight. The weight of fuel is determined from measuring the volume of fuel added to the aircraft during refueling.

The CG of the aircraft can be monitored while the aircraft is being loaded. This allows personnel to position baggage and cargo below decks in order to locate the CG more favorably for flight operations and the lower fuel consumption. The CG of the aircraft just before being dispatched and for takeoff can also be monitored and determined.

Once the CG and weight determinations are made, the aircraft is then dispatched, and approved for flight. The aircraft then departs the gate, taxis to the runway and then takes off. After takeoff, the aircraft of course operates in flight.

Additionally, as an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

The invention claimed is:

1. A method of determining the center of gravity of an aircraft on the ground and having main landing gear struts and a nose landing gear strut, each of the main and nose landing gear struts supporting a respective aircraft load when the aircraft is on the ground, comprising the steps of:
   a) measuring the load supported by each of the main landing gear struts;
   b) measuring the load supported by the nose landing gear strut;
   c) combining the measured loads on the main landing gear struts;
   d) comparing the measured load on the nose landing gear struts to the combined measured loads on the main landing gear struts and determining the aircraft center of gravity from the comparisons;
   e) determining the weight of the aircraft independently of the measured loads on the main and nose landing gear struts.

2. The method of claim 1 further comprising the step of dispatching the aircraft for a flight using the determined aircraft center of gravity and the independently determined aircraft weight.

3. The method of claim 1 wherein the step of determining the weight of the aircraft independently of the measured loads on the main and nose landing gear struts further comprises the step of using assumptions of weight for passengers and baggage.

4. The method of claim 1 wherein the step of determining the aircraft center of gravity from the comparison further comprises referring to a look-up table.

5. The method of claim 1 wherein:
   a) the step of measuring a load supported by each of the main landing gear struts further comprises the step of measuring a pressure of each of the main landing gear struts;
   b) the step of measuring a load supported by the nose landing gear strut further comprises the step of measuring a pressure of the nose landing gear strut;
   c) the step of comparing the measured loads of the main struts and the nose strut further comprises the step of comparing the combined measured pressures of the main struts and the pressure of the nose strut.

6. The method of claim 1 wherein each of the nose and main landing gear struts have an axle, wherein:
   a) the step of measuring a load supported by each of the main landing gear struts further comprises the step of measuring a deflection in each of the main landing gear strut axles;
   b) the step of measuring a load supported by the nose landing gear strut further comprises the step of measuring a deflection in the nose landing gear strut axle;
   c) the step of comparing the measured loads of the main struts and the load of the nose strut further comprises the step of comparing the measured axle deflections of the main struts and the measured axle deflection of the nose strut.

7. The method of claim 1 wherein the step of determining the aircraft center of gravity further comprises the step of determining the aircraft center of gravity as a % MAC.

8. The method of claim 1 wherein the step of determining the aircraft center of gravity further comprises the step of determining the aircraft center of gravity as a distance relative to an aircraft station number.

9. The method of claim 1 wherein the step of determining the aircraft center of gravity further comprises the step of determining a location of the center of gravity laterally, relative to a longitudinal axis of the aircraft.

10. The method of claim 1 wherein the nose landing gear strut is smaller than each of the main landing gear struts, further comprising the step of adjusting the load measurement on the nose landing gear strut to compensate for the smaller size of the nose landing gear strut.

11. The method of claim 2 further comprising the step of, after dispatching the aircraft for a flight, taking off in the aircraft.

* * * * *